C. P. CASS.
COMBINED AUTOMATIC AND INDEPENDENT BRAKE.
APPLICATION FILED APR. 16, 1908.
979,929.
Patented Dec. 27, 1910.
2 SHEETS—SHEET 1.
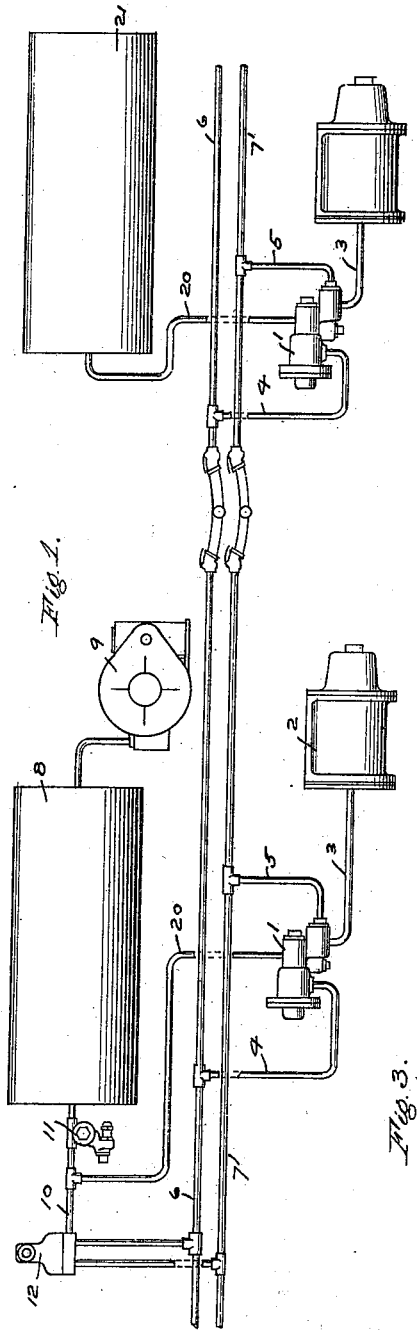
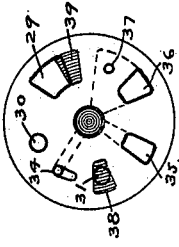
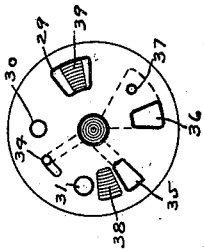
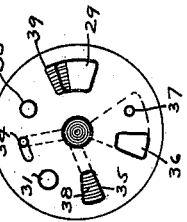
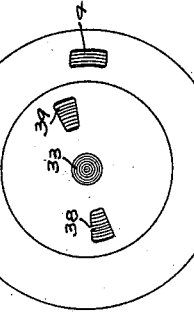
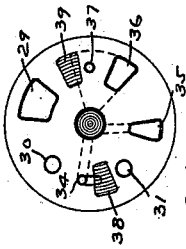
WITNESSES
INVENTOR
Christopher P. Cass
by
Att'y.

C. P. CASS.
COMBINED AUTOMATIC AND INDEPENDENT BRAKE.
APPLICATION FILED APR. 16, 1908.
979,929.
Patented Dec. 27, 1910.
2 SHEETS—SHEET 2.
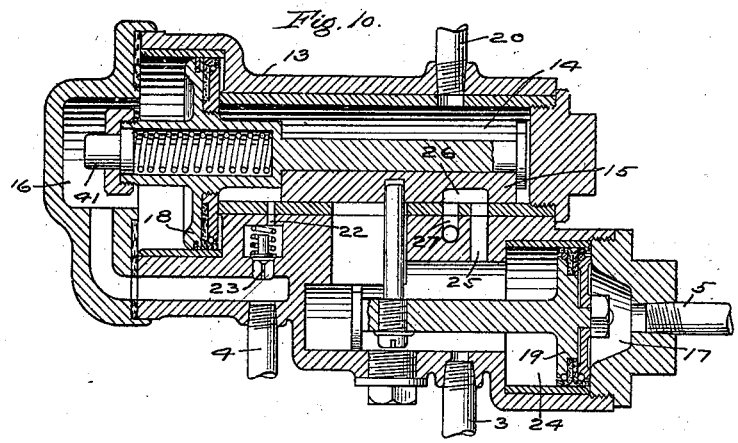
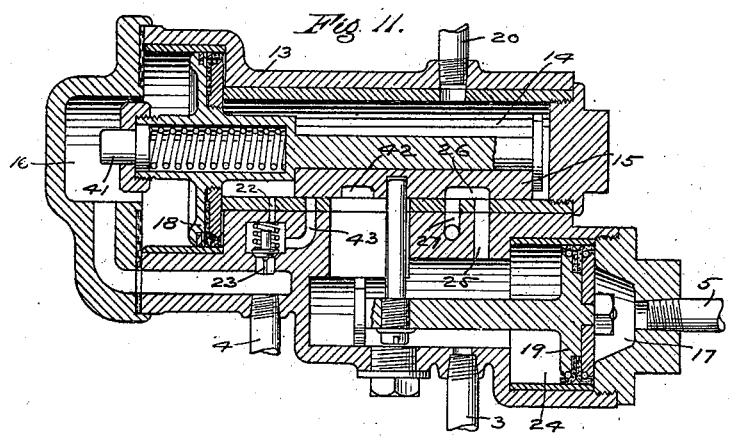
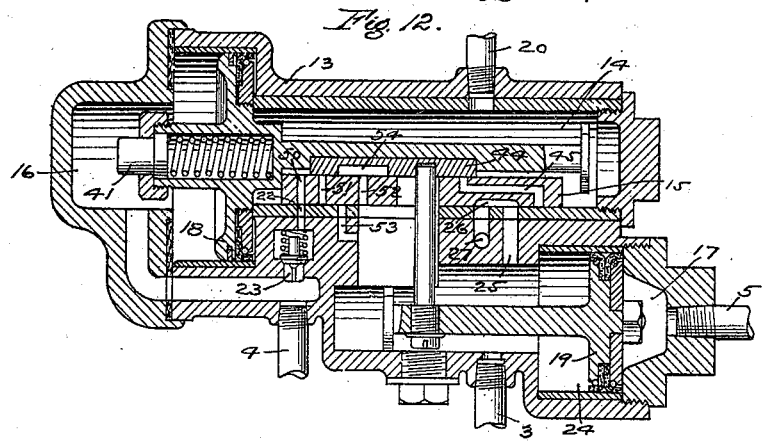

UNITED STATES PATENT OFFICE.

CHRISTOPHER P. CASS, OF MAPLEWOOD, MISSOURI, ASSIGNOR TO THE WESTINGHOUSE AIR BRAKE COMPANY, OF PITTSBURG, PENNSYLVANIA, A CORPORATION OF PENNSYLVANIA.

COMBINED AUTOMATIC AND INDEPENDENT BRAKE.

979,929.

Specification of Letters Patent. Patented Dec. 27, 1910.

Application filed April 16, 1908. Serial No. 427,403.

*To all whom it may concern:*

Be it known that I, CHRISTOPHER P. CASS, a citizen of the United States, residing at Maplewood, in the county of St. Louis and State of Missouri, have invented new and useful Improvements in Combined Automatic and Independent Brakes, of which the following is a specification.

My invention relates to a combined automatic and independent air brake apparatus, and is more particularly adapted for electric traction service, either on cars operated singly or on trains up to four or five cars. By employing a combined equipment of this character, the ease of manipulation and superior flexibility of the independent air brake, is combined with the well known and desirable features of the automatic air brake.

One object of my invention is to provide a combined automatic and independent brake apparatus having a controlling valve mechanism which may be operated either according to the pressure in the automatic brake pipe or in the independent brake pipe for controlling the supply of air from the reservoir or source of fluid pressure to the brake cylinder, whereby the pressure in the brake cylinder may be graded up or down by variation in either automatic or independent brake pipe pressure.

Another object of my invention is to provide a controlling valve device which is directly operated by the pressures in the automatic and the independent brake pipes.

Another object is to provide a controlling valve device for governing the supply of air to the brake cylinder, which is subject to the pressures of the automatic brake pipe and the brake cylinder, in one direction, opposing the pressures of the independent brake pipe and the supply reservoir in the opposite direction.

Another object of my invention is to provide a combined automatic and independent brake apparatus having a valve device governed according to an increase in pressure in the independent brake pipe for supplying air from the automatic brake pipe to the brake cylinder.

Another object is to provide a single brake valve designed to control the pressure in the automatic and the independent brake pipes to obtain the above results.

Still another feature of my improvements is to provide an improved automatic valve device subject to the pressures of the automatic brake pipe and the brake cylinder in one direction, opposing the pressure of the supply reservoir in the opposite direction for governing the supply of air to the brake cylinder.

In the accompanying drawings; Figure 1 is a diagrammatic view of a combined automatic and independent brake for a motor car and trailer, with my improvements applied thereto; Fig. 2 a face view of the rotary valve for the motorman's brake valve, showing the arrangement of ports therein; Fig. 3 a plan view of the valve seat for said rotary valve; Figs. 4 to 9 inclusive, diagrams illustrating the brake valve in the respective positions of release, independent lap, independent application, automatic lap, automatic service application, and automatic emergency application; Fig. 10 a central sectional view of one construction of the controlling valve mechanism; Fig. 11 a similar view of a slightly modified form of controlling valve mechanism, and Fig. 12 still another modified form thereof.

According to Fig. 10 of the drawings the controlling valve mechanism 1 may comprise a casing 13 having a valve chamber 14, containing a slide valve 15 and piston chambers 16 and 17 respectively, containing pistons 18 and 19, operatively connected to the valve 15. The chamber 16 is open to the automatic brake pipe 6 through branch pipe 4, so that piston 18 is constantly subject to automatic brake pipe pressure, while chamber 17 communicates with independent brake pipe 7 through a branch pipe 5, so that piston 19 is subject to the pressure in the independent brake pipe.

The slide valve chamber 14 is connected to a source of fluid pressure, on a motor car preferably to the main reservoir 8, which may be supplied with compressed air by the usual air compressor 9, and which is connected to said valve chamber by a pipe 20 having a reducing valve 11 interposed in the main reservoir connection, so as to limit the maximum pressure in the valve chamber to a predetermined degree. On trailer cars a storage reservoir 21 is provided, preferably of considerable storage capacity, which is connected by pipe 20 to the valve chamber 14. The brake cylinder 2 is connected by pipe 3 to chamber 24 at the inner face of the piston 19, so that said piston is constantly subject to brake cylinder pressure. A port 25 leads from the seat of slide valve 15 to the chamber 24, and in the normal release position of the slide valve 15 is connected by a cavity 26 therein with brake cylinder exhaust port 27.

The brake pipes 6 and 7 lead to the ports 39 and 38 respectively in the motorman's brake valve 12, said brake valve having a rotary valve 12, the chamber above which is connected by pipe 10 and passage 40 in the brake valve casing with the main reservoir 8, the chamber being supplied with air through the reducing valve 11 in the usual manner, so as to limit the pressure supplied through the brake valve to the brake system to the desired standard degree of pressure. The rotary valve seat is also provided with an exhaust port 33 and the rotary valve 12 is provided with through ports 29, 30 and 31, and with a central opening 32 adapted to constantly register with exhaust port 33, the opening 32 being connected by passages in the rotary valve with exhaust openings 34, 35, 36 and 37 in the face of the valve.

The operation of the apparatus so far as described is as follows: The brake valve being in the full release position, as shown in the diagram, Fig. 4, through port 29 registers with the automatic brake pipe port 39, so that fluid under pressure, according to the adjustment of the feed valve 11 is admitted to the automatic brake pipe 6, thence the fluid under pressure flows to the piston chamber 16. On the motor car, air also flows through the pipe 20 to the valve chamber 14 and thus the chambers on opposite sides of the piston 18 become charged to the normal standard pressure. On the trailer car the reservoir 21 is charged from the automatic brake pipe, preferably through a passage 22, controlled by the slide valve 15 and containing a non-return check valve 23, so that the fluid under pressure from the automatic brake pipe flows through the port 22 past check valve 23, charging the valve chamber 14 and the storage reservoir 21 to the normal standard pressure. In the release position, exhaust opening 35 in the rotary valve registers with independent brake pipe port 38, so that said pipe is open to the atmosphere, and any leakage of air into the brake cylinder chamber 24 and thence by the piston 19 to the independent brake pipe will be released to the atmosphere.

If it is desired to make an automatic service application of the brakes, the brake valve is turned to the service application position, shown in Fig. 8, in which the exhaust opening 37 registers with automatic brake pipe port 39 and fluid under pressure is vented from the brake pipe. The desired reduction in brake pipe pressure having been caused, the brake valve handle is turned to automatic lap position, Fig. 7, in which the automatic brake pipe port 39 is lapped. The reduction in pressure thus produced on the piston 18 causes the higher reservoir pressure in the valve chamber 14 to shift the piston 18 outwardly, the valve 15 closing the exhaust port 27 and the recharging port 22. Further movement of the slide valve opens the brake cylinder port 25 to the valve chamber 14, and fluid under pressure from the reservoir flows into the brake cylinder chamber 24 and thence through the brake cylinder pipe 3 to the brake cylinder. As the pressure in the brake cylinder increases the pressure in the brake cylinder chamber 24 and on the inner face of the piston 19 also rises, until the reservoir pressure on the piston 18 tending to move the valve 15 in one direction is slightly overbalanced by the brake cylinder pressure on the piston 19 and the reduced automatic brake pipe pressure on the piston 18 acting in the opposite direction. The valve parts then move back to lap position, assisted in the movement by the usual graduating spring device 41 in the piston 18. Should the brake cylinder pressure fall by leakage or otherwise, it will now be seen that a corresponding reduction in pressure on the piston 19 is caused, which permits the higher reservoir pressure on the piston 18 to again shift the piston and the slide valve 15 to open the brake cylinder port 25 and thus restore the pressure in the brake cylinder, the valve parts being returned to lap position upon restoration of the equilibrium of pressures on the pistons. It will be clear that the brake cylinder pressure may be increased as desired by making further reductions in automatic brake pipe pressure, the controlling valve mechanism operating as before described.

In order to prevent pressure from building up on the independent brake pipe side of the piston 19 by reason of possible leakage of air past said piston, which pressure would tend to shift the valve parts in the direction to open the brake cylinder supply port and unduly increase the brake cylinder pressure, I preferably provide the port 34 in the brake valve, which is adapted in automatic service and service lap positions to register with the independent brake pipe port 38 and thereby vent any air collecting in the independent pipe to the atmosphere.

An independent application of the brakes may be made by turning the brake valve to the independent application position, which is shown in Fig. 6. In this position, the through port 31 registers with the independent brake pipe port 38, so that air is supplied from the rotary valve chamber to the independent brake pipe and thence to the chamber 17 at the outer face of piston 19.

The opposing pressures on the automatic piston 18 remain substantially equal, and the fluid pressure on the outer face of piston 19 thereupon shifts the piston and the slide valve 15, first closing the exhaust port 27 and the recharging port 22 and then opening the brake cylinder port 25. Upon the pressure in the brake cylinder and on the inner face of piston 19 slightly exceeding the pressure in the independent brake pipe, the valve parts are shifted with the aid of the graduating spring back to a position closing the brake cylinder port 25, but not far enough to open the exhaust port to the brake cylinder. If the brake cylinder pressure falls from any cause the higher pressure on the outer face of the independent piston 19 causes the piston and the slide valve to be shifted and again open the brake cylinder port until the pressure in the brake cylinder is restored, the piston 19 then moving back and closing the brake cylinder port. By reason of the large size of the reservoir 21 on the trailer car the pressure therein will not be reduced to any considerable extent by flow to the brake cylinder, so that the pressures on the opposite sides of the automatic piston 18 remain substantially balanced, and do not effect the operation of the parts. The brake cylinder pressure may be further increased by increasing the pressure in the independent brake pipe, which causes the piston 19 and the valve 15 to again open the brake cylinder port 25 and supply air to the brake cylinder until the increasing brake cylinder pressure again causes the brake cylinder port to be closed.

In the independent application position the automatic brake pipe port 39 may be connected to the fluid pressure supply as by way of the through port 29 in the rotary valve, in order to maintain the pressure therein at the normal standard pressure against leakage. Also in the independent lap position, as shown in Fig. 5, the port 29 registers with the automatic brake pipe port 39 for the same reason.

An emergency application is effected by turning the brake valve to the position shown in the diagram, Fig. 9, in which the automatic brake pipe port 39 is connected by the large port opening 36 in the rotary valve with the exhaust. A sudden reduction in automatic brake pipe pressure is thus produced, which causes the piston 18 to be shifted to its extreme outer position seating on the usual emergency gasket. The slide valve 15 opens wide the brake cylinder port 25, so that air is supplied to the brake cylinder in large volume to cause an emergency application of the brakes.

In order to assist and accelerate the emergency action of the controlling valve parts I may provide a through port 30 in the rotary valve, which is adapted in the emergency position to register with the independent brake pipe port 38 and thus supply air to the independent piston, which, of course, tends to move the piston inwardly and thereby assist in the rapid action of the parts. The brakes may be released after an emergency application by turning the brake valve to release position, the parts operating as in releasing the brakes after a service application.

According to the construction shown in Fig. 11 of the drawings, I provide a port 43 leading from the automatic brake pipe to the slide valve seat, and a cavity 42, in the slide valve 15, which is adapted to connect said port with the brake cylinder chamber 24 in the movement of the valve from release position. It will now be seen that upon causing an increase in pressure in the independent brake pipe, the valve parts are shifted and the cavity 42 connects the port 43 with the brake cylinder chamber 24, and air is thereupon supplied from the automatic brake pipe to the brake cylinder. Should the flow of air from the brake pipe to the brake cylinder be greater than the feed of air into the brake pipe from the brake valve, the brake pipe pressure may be reduced sufficiently to cause further movement of the slide valve 15, but in this event the brake cylinder port 25 will be opened and air from the reservoir is admitted to the brake cylinder, and as soon as the brake cylinder pressure has built up in chamber 24 and on piston 19 sufficiently, the piston 19 and valve 15 are moved back and the supply ports 25 and 43 are lapped.

The construction may be made more sensitive, if desired, by employing a graduating valve for controlling the ports, as shown in Fig. 12, in which a graduating valve 44 is mounted on and has a movement relative to the main slide valve 15. In this case, the recharging port 22 registers in the release position of the parts with a port 50 through the main slide valve, so that air is fed into the auxiliary reservoir from the train pipe in release position, the port 22 being closed upon movement of the graduating valve 44 in the outward movement thereof in applying the brakes. By this means back leakage from the auxiliary reservoir to the train pipe is prevented, in case the check valve 23 leaks. The main slide valve 15 is also provided with through ports 51 and 52, adapted to register with the port 22 and a port 53 in service application position, communication being established through a cavity 54 provided in the graduating valve, so that air is supplied from the train pipe through port 51, cavity 54, port 52 and 53 to chamber 24 and thence to the brake cylinder. The graduating valve 44 also controls a through port 45 in the main slide valve, which is adapted to register with port 25 in the outward movement of the valve, the port 25 being preferably located so as to establish communication for supplying air from the reservoir to the brake cylinder upon a further outward movement of the piston after the train pipe supply ports come into register. By this means, no air is supplied from the storage reservoir to the brake cylinder, unless the flow of air from the train pipe to the brake cylinder reduces the train pipe pressure to such a degree as to cause the reservoir pressure on the opposite side of the piston 18 to move the piston to a further outward position. Thus, for ordinary independent service applications of the brakes, the brake cylinder is supplied with air from the train pipe without disturbing the pressure in the storage reservoir.

In order to insure the charging up of storage reservoirs on trailer cars to full standard pressure carried in the train pipe, a small through port may be provided in the piston 18, or a feed groove adapted to open in release position, may be provided, so as to establish communication from the train pipe to the storage reservoir and fully charge the same to normal pressure.

By means of my invention, a substantially uniform brake cylinder pressure is maintained, regardless of brake piston travel. A very simple mechanism of few parts is thus provided, which may be easily manipulated by means of a single brake valve to secure either an automatic or independent application of the brakes. My improvement may, also, be employed on locomotives to obtain automatic and straight air control of the engine brakes, and, in fact, as will be apparent, is adapted for general use.

Having now described my invention, what I claim as new and desire to secure by Letters Patent, is:

1. In a fluid pressure brake, the combination with an automatic brake pipe, independent brake pipe, and brake cylinder, of a valve device operated at all times by varying pressure in either the automatic or the independent brake pipe for controlling the supply of air to the brake cylinder.

2. In a fluid pressure brake, the combination with an automatic brake pipe, independent brake pipe, and brake cylinder, of a valve device constantly subject to variations in either automatic or independent brake pipe pressure for controlling the admission and release of fluid under pressure to and from the brake cylinder.

3. In a fluid pressure brake, the combination with an automatic brake pipe, independent brake pipe, and brake cylinder, of a valve device operated directly by variations in pressure in either the automatic or the independent brake pipe for controlling the supply of air to the brake cylinder in service applications.

4. In a fluid pressure brake, the combination with an automatic brake pipe, independent brake pipe, brake cylinder and reservoir, of a valve device subject to the pressures of the automatic brake pipe and the brake cylinder opposing the pressures of the independent brake pipe and the reservoir for governing the supply of air to the brake cylinder.

5. In a fluid pressure brake, the combination with a brake cylinder, automatic brake pipe, and an independent brake pipe, of a valve device subject to the opposing pressures of the automatic brake pipe and the independent brake pipe for controlling the admission and release of fluid under pressure to and from the brake cylinder.

6. In a fluid pressure brake, the combination with a brake cylinder, automatic brake pipe, and an independent brake pipe, of a valve device subject to the pressures of the automatic brake pipe and the brake cylinder opposing the pressure of the independent brake pipe for controlling the supply of air to the brake cylinder.

7. In a fluid pressure brake, the combination with a brake cylinder, automatic brake pipe, and an independent brake pipe, of a valve device operated by an increase in pressure in the independent brake pipe for supplying air from the automatic brake pipe to the brake cylinder.

8. In a fluid pressure brake, the combination with a brake cylinder, automatic brake pipe, and an independent brake pipe, of a valve device operated by an increase in the independent brake pipe pressure for primarily supplying air from the automatic brake pipe to the brake cylinder and adapted upon further movement to supply air from another source of pressure to the brake cylinder.

9. In a fluid pressure brake, the combination with a brake cylinder, automatic brake pipe, and an independent brake pipe, of a valve device constantly subject to the pressures in both said pipes and operating either upon a reduction in automatic brake pipe pressure or an increase in the independent brake pipe pressure for supplying air to the brake cylinder and a brake valve having means for controlling the fluid pressures in said brake pipes.

10. In a fluid pressure brake, the combination with a brake cylinder, of two lines of train pipe, one normally carrying fluid under pressure and the other normally at atmospheric pressure, and a valve device operated by a gradual reduction in pressure in the first mentioned pipe or an increase in pressure in the second pipe to cause a service application of the brakes.

11. In a fluid pressure brake, the combination with a brake cylinder, of an automatic train pipe, a train pipe normally at atmospheric pressure, and a valve device comprising valve means for governing the admission of air to the brake cylinder, a piston operated upon a reduction in pressure in the automatic train pipe, and a piston operated by an increase in pressure in the second mentioned train pipe for actuating said valve means to cause a service application of the brakes.

12. In a fluid pressure brake, the combination with a brake cylinder and two train brake pipes, of valve means for controlling the admission of fluid under pressure to the brake cylinder, a movable abutment operated by a reduction in pressure in one train pipe and a movable abutment operated by an increase in pressure in the other train pipe for actuating said valve means.

13. In a fluid pressure brake, the combination with a brake cylinder, automatic brake pipe, and an independent brake pipe, of a valve device operating either upon a reduction in automatic brake pipe pressure or an increase in the independent brake pipe pressure for supplying air to the brake cylinder, and a brake valve having means for opening said independent pipe to the atmosphere upon an automatic service application of the brakes.

14. In a fluid pressure brake, the combination with a brake cylinder, automatic brake pipe, and an independent brake pipe, of a valve device operating either upon a reduction in automatic brake pipe pressure or an increase in the independent brake pipe pressure for supplying air to the brake cylinder, and a brake valve having ports for opening the independent brake pipe to the atmosphere in the automatic service application position thereof.

15. In a fluid pressure brake, the combination with a brake cylinder, automatic brake pipe, and an independent brake pipe, of a valve device operating either upon a reduction in automatic brake pipe pressure or an increase in the independent brake pipe pressure for supplying air to the brake cylinder, and a brake valve for controlling the pressure in said brake pipes and having means for supplying air to the independent brake pipe in the automatic emergency position of said brake valve.

16. In a fluid pressure brake, the combination with a brake cylinder, automatic brake pipe, and main reservoir, of an automatic valve device subject to the opposing pressures of the automatic brake pipe and the brake cylinder in one direction and the reservoir in the opposite direction for controlling the supply of air to the brake cylinder.

17. In a fluid pressure brake, the combination with a brake cylinder, automatic brake pipe and main reservoir, of a valve device subject to the opposing pressures of the automatic brake pipe and the brake cylinder in one direction and said reservoir in the opposite direction for controlling the supply of air from the reservoir to the brake cylinder.

18. In a fluid pressure brake, the combination with a brake cylinder, automatic brake pipe and an independent brake pipe, of a valve device comprising a piston subject to automatic brake pipe pressure, a piston subject to independent brake pipe pressure, and a valve, adapted to be actuated by either piston, for controlling the supply of air to the brake cylinder.

19. In a fluid pressure brake, the combination with a brake cylinder, automatic brake pipe, independent brake pipe, brake cylinder, and a source of fluid pressure, of a valve device comprising a piston subject to variations in automatic brake pipe pressure, a piston subject to variations in independent brake pipe pressure, and a valve, adapted to be actuated by either piston, for controlling the supply of air from said source of fluid pressure to the brake cylinder.

In testimony whereof I have hereunto set my hand.

CHRISTOPHER P. CASS.

Witnesses:
E. S. ADREAN,
W. GLASGOW CLARK.